(12) United States Patent
Shibata et al.

(10) Patent No.: US 6,548,747 B2
(45) Date of Patent: Apr. 15, 2003

(54) SYSTEM OF DISTRIBUTING MUSIC CONTENTS FROM SERVER TO TELEPHONY TERMINAL

(75) Inventors: Takaaki Shibata, Shizuoka-ken (JP);
Hiroaki Takahashi, Shizuoka-ken (JP);
Takuya Takahashi, Shizuoka-ken (JP);
Atsushi Yamaura, Shizuoka-ken (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/081,295

(22) Filed: Feb. 20, 2002

(65) Prior Publication Data

US 2002/0112597 A1 Aug. 22, 2002

(30) Foreign Application Priority Data

Feb. 21, 2001 (JP) ......................... 2001-044713

(51) Int. Cl.[7] ............................ G09B 15/04; G10H 7/00
(52) U.S. Cl. ........................................ 84/609; 84/477 R
(58) Field of Search ................... 84/609–614, 634–638, 84/477 R, 478; 434/307 A (56) References Cited

U.S. PATENT DOCUMENTS

| | | | |
|---|---|---|---|
| 5,864,868 A | * | 1/1999 | Contois .................... 84/609 X |
| 5,886,275 A | | 3/1999 | Kato et al. |
| 5,890,910 A | | 4/1999 | Tsurumi et al. |
| 5,953,005 A | * | 9/1999 | Liu ..................... 434/307 A X |
| 5,969,283 A | * | 10/1999 | Looney et al. ................ 84/609 |
| 6,096,961 A | * | 8/2000 | Bruti et al. ................... 84/609 |

* cited by examiner

*Primary Examiner*—Stanley J. Witkowski
(74) *Attorney, Agent, or Firm*—Morrison & Foerster LLP (57) ABSTRACT

In an information service system whereby a server apparatus distributes music performance data to a telephony terminal apparatus through a network, the telephony terminal apparatus includes a storage section that stores an application program to be executed by a processing section for sending to the server apparatus a search query effective to specify target music performance data and acquiring the target music performance data from the server apparatus for exclusive use by the application program. In the server apparatus, a first distributing section responds to the search query in the form of contents that are dedicated for use by the application program. A second distributing section of the server apparatus responds to a request from the telephony terminal apparatus for distributing second contents of the same target music performance data to the telephony terminal apparatus such that the second contents can be treated by the telephony terminal apparatus independently of the application program.

11 Claims, 10 Drawing Sheets

SYSTEM OF DISTRIBUTING MUSIC CONTENTS FROM SERVER TO TELEPHONY TERMINAL

BACKGROUND OF THE INVENTION

1. Technical Field of the Invention

The present invention relates to a telephony terminal apparatus for receiving a distribution service of contents such as karaoke music performance data, and a distribution server apparatus for distributing the contents.

The present invention particularly relates to a mobile telephony terminal apparatus capable of subscribing a new information service in which an application program is installed and executed independently of a web browser and a talking function.

2. Related art

In a conventional mobile telephony terminal apparatus of a cellular system, personal handy-phone system (PHS), or the like, it is known that music performance data is downloaded from a server on a network and reproduced as a ringing tone melody of a mobile phone. Moreover, it is also known that the music performance data is downloaded from the server and a speaker of a mobile terminal is used to carry out karaoke performance.

However, karaoke capability of the mobile phone is a mere extension of a performance function of the ringing tone melody. That is, for the music performance data for karaoke, a format of ringing tone melody data is expanded, such that words data can simply be incorporated. Therefore, there have been many restrictions.

Additionally, since the karaoke performance can be carried out specifically on dedicated hardware of each mobile telephony terminal, it has been difficult to catch up with enhancement of a processing ability of a terminal apparatus with development of a technique, and modification or improvement of service specifications.

Moreover, it is necessary to meet a requirement for security holding and copyright protection in order to develop a contents business.

Then, a new type of telephony terminal has been developed which can execute an application program prepared by Java (registered trademark) in a mobile telephony terminal with a information service function for connecting to Internet so that a web page can be seen, and an electronic mail function is available. Such a mobile telephony terminal for a so-called i-mode (registered trademark). Java (registered trademark) is a programming language of an interpreter type, and is called a Java virtual machine.

In this new type of telephony terminal, the aforementioned application program for realizing the new information service function is disposed on a mobile telephony terminal side, and can be executed as a standalone program.

Particularly, the aforementioned application program does not depend on a machine type, or is formed as a component and therefore has expandability. Since it is possible to freely change a format, it is advantageously easy to prepare software and modify or improve specifications.

For the application program, three to ten small programs having a limit of 10 KB can be stored in one mobile telephony terminal. A scratch pad (memory) usable only associated with each application program has a limit of 5 KB, and contents such as music performance data are stored.

The application program is sometimes preset at a time of shipment of a new terminal product from a factory, but a user starts up a browser and can download the program from the server on the network. Moreover, the contents data for exclusive use in the application program can also similarly be downloaded to the scratch pad from the server.

The application program and scratch pad operate on a virtual machine. Therefore, the application program is constituted in principle to be separate from and be independent of a processing belonging to the original telephone function of the mobile telephony terminal and the conventional information service function such as the browser and electronic mail. As a result, the contents data for use in the aforementioned application program cannot be utilized as the ringing tone melody belonging to the telephone function.

In the new information service, security protection and copyright protection are strengthened with respect to a contents distribution service. On the other hand, since the service is separated from the conventional contents distribution service carried out using the browser, there is inconvenience in sharing the same or associated contents between the new service and the conventional service.

Therefore, there has been a demand for a new contents distribution service in which advantages of the new information service are exploited and cooperation with the conventional contents service is considered.

SUMMARY OF THE INVENTION

The present invention has been developed to solve the aforementioned problem, and has an object to provide a telephony terminal apparatus in which a communication data amount or a communication time is reduced during selection of contents according to a search result of the contents, and a communication charge can be reduced, and to provide a server apparatus in which first and second distribution means can cooperate to distribute contents data such as music performance data and ringing tone melody to the telephony terminal apparatus. Moreover, the present invention covers a program for allowing a computer to execute such processing.

In a general concept of the invention, an information service system comprises a server apparatus for distributing music performance data through a network, and a telephony terminal apparatus for acquiring the music performance data from the server apparatus through the network. The telephony terminal apparatus comprises a storage section that stores an application program, and a processing section that executes the application program for sending a search query effective to specify target music performance data to the server apparatus and acquiring the target music performance data from the server apparatus for exclusive use by the application program. The server apparatus comprises a first distributing section responsive to the search query for distributing the target music performance data to the telephony terminal apparatus in the form of first contents which are dedicated for use by the application program, and a second distributing section responsive to a request from the telephony terminal apparatus for distributing second contents of the same target music performance data to the telephony terminal apparatus such that the second contents can be treated by the telephony terminal apparatus independently of the application program.

In a first aspect of the invention, there is provided a telephony terminal apparatus communicable with a server apparatus distributing contents through a network. The apparatus comprises a storage section that stores an application program and a processing section that executes the application program for performing a process comprising the steps of prompting a user to input a search query effective to specify target music performance data, sending the search query to the server apparatus through the network for enabling the server apparatus to search for contents matching the search query, receiving one or more of identification information corresponding to the contents matching the search query from the server apparatus, displaying the received identification information in a selection screen form which is formulated by the application program, selecting at least one of the identification information from the selection screen form to request the server apparatus for distribution of the contents corresponding to the selected identification information, and acquiring the target music performance data in the distributed contents from the server apparatus.

Therefore, when the contents selection screen is prepared, it is unnecessary to transmit form data of the contents selection screen from the server apparatus side. Therefore, a communication data amount is reduced with packet switching, a communication time is shortened with circuit switching, and a communication charge can be reduced.

In a second aspect of the invention, there is provided a server apparatus for distributing music performance data through a network to a telephony terminal apparatus installed with an application program treating the music performance data. The server apparatus comprises a first distributing section that distributes the music performance data to the telephony terminal apparatus in the form of first contents corresponding to identification information designated by means of the application program, a receiving section that receives a request for distribution of second contents corresponding to the same identification information from the telephony terminal apparatus after the application program is quitted, and a second distributing section that distributes the second contents to the telephony terminal apparatus such that the second contents can be treated by the telephony terminal apparatus for use of the music performance data while the first contents are exclusively treated by the application program for use of the same music performance data.

Therefore, the second contents data having the common identification information with the first contents of music performance data distributed by the first distribution section, such as associated contents data including a ringing tone melody, score, words card, photograph image of an artist, and the like can be distributed to the same telephony terminal apparatus as the distribution destination of the music performance data in cooperation with the first distribution section. In this case, since the ID or the password is collated, the second distribution data is prevented from being distributed to a different distribution destination.

For example, it is possible to distribute the music performance data only to the application program operating separately on a virtual machine independent of other machines and to distribute the second contents data having the common identification information, such as a music program with the conventional contents distribution service having little restriction on contents use.

In a third aspect of the invention, in the above described server apparatus, the second distributing section distributes the second contents which are treated to reproduce the music performance data as a ringing tone sounded when the telephony terminal apparatus receives a phone call.

Therefore, the ringing tone melody can be stored in the telephony terminal in response to a user's request regardless of restrictions of the music performance data distributed by the first distribution section, such as a use condition and use frequency limitation. As a result, a service quality of the distribution service of the music performance data increases.

In a fourth aspect of the invention, there is provided an application program for use in a telephony terminal apparatus communicable with a server apparatus distributing contents through a network. The application program is executed by a processor for causing the telephony terminal apparatus to perform a process comprising the steps of prompting a user to input a search query effective to specify target music performance data, sending the search query to the server apparatus through the network for enabling the server apparatus to search for contents matching the search query, receiving one or more of identification information corresponding to the contents matching the search query from the server apparatus, displaying the received identification information in a selection screen form which is formulated by the application program, selecting at least one of the identification information from the selection screen form to request the server apparatus for distribution of the contents corresponding to the selected identification information, and acquiring the target music performance data in the distributed contents from the server apparatus.

The application program may be installed in the telephony terminal apparatus at a time of shipment from a factory, or may be downloaded via the network.

In a fifth aspect of the invention, there is provided a computer program installable in a server apparatus having a processor and distributing music performance data through a network to a telephony terminal apparatus installed with an application program treating the music performance data. The computer program is executable by the processor for causing the server apparatus to perform a process comprising the steps of distributing the music performance data to the telephony terminal apparatus in the form of first contents corresponding to identification information designated by means of the application program, receiving a request for distribution of second contents corresponding to the same identification information from the telephony terminal apparatus after the application program is quitted, and distributing the second contents to the telephony terminal apparatus such that the second contents can be treated by the telephony terminal apparatus for use of the music performance data while the first contents are exclusively treated by the application program for use of the same music performance data.

BRIEF DESCRIPTION OF THE DRAWINGS

FIGS. 2(a)–2(f) are an explanatory view showing concrete examples of input screens displayed in a display monitor device shown in FIG. 1.

DETAILED DESCRIPTION OF THE EMBODIMENTS

Figure 1:
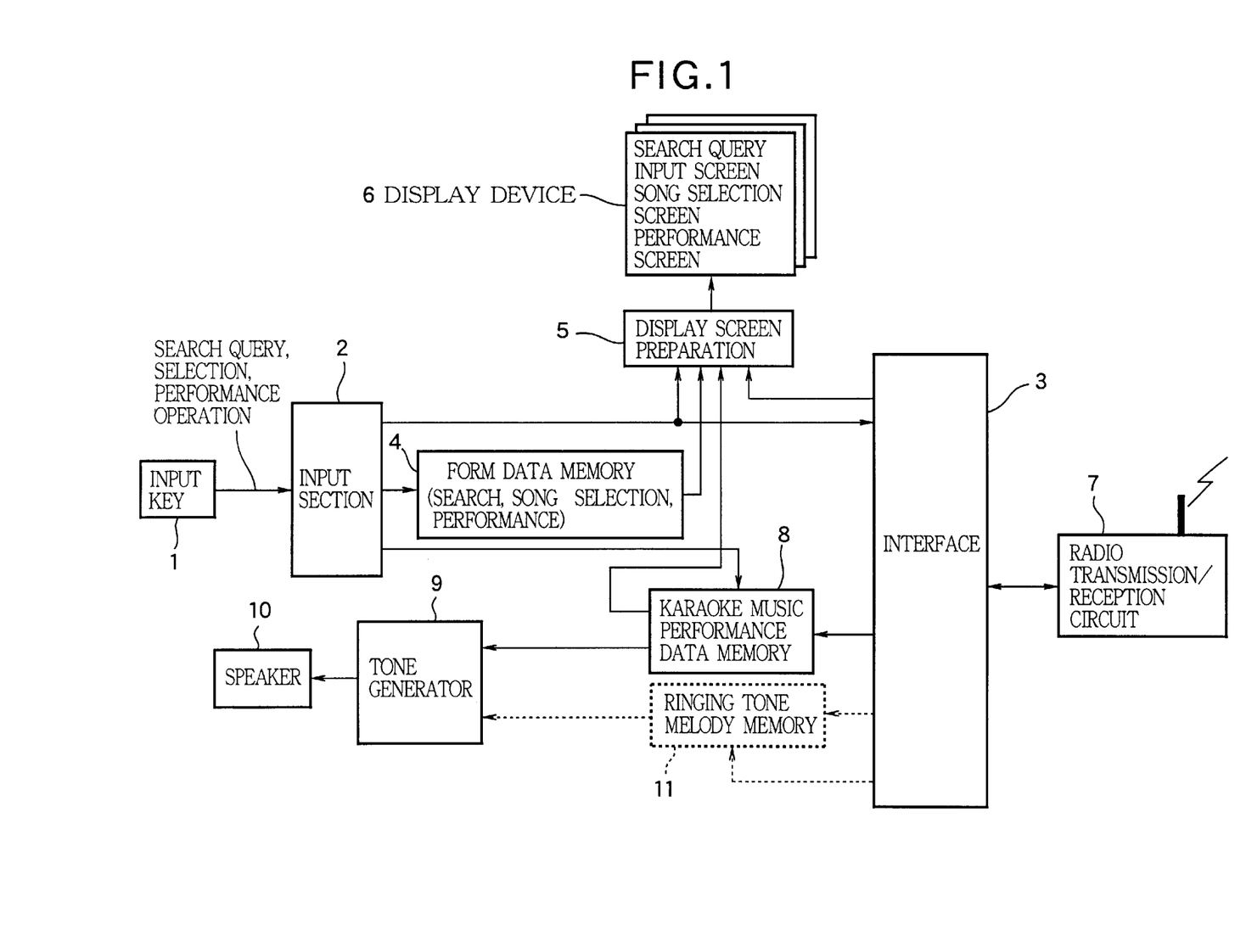
FIG. 1 is a functional constitution diagram of one embodiment of a telephony terminal apparatus according to the present invention.

FIG. 1 is a functional constitution diagram of one embodiment for implementing a telephony terminal apparatus of the present invention. In the telephony terminal apparatus, an application program using music performance data stored in a server on a network (not shown) is installed.

In the drawing, reference numeral 1 denotes an input key, 2 denotes an input section, 3 denotes an interface, 4 denotes a form data memory, 5 denotes a display screen preparation section, 6 denotes a display device, 7 denotes a radio transmission/reception circuit, 8 denotes a karaoke music performance data memory, 9 denotes a tone generator, 10 denotes a speaker, and 11 denotes a ringing tone melody memory.

It is difficult to clearly indicate a range of a function executed by the application program, but the form data memory 4, reading/writing of the karaoke music performance data memory 8, and display screen preparation section 5 are executed by the application program. A memory region for use by the application program is assigned by Java Application Manager (JAM), and the program is stored as a Java Archive (JAR) file.

The input key 1 disposed on an operation panel of a mobile telephony terminal carries out input of a search query, a selection of one song or a plurality of songs from a search result, and performance operations such as play and stop in karaoke performance. The input section 2 outputs data to the display screen preparation section 5, form data memory 4, and karaoke music performance data memory 8 in accordance with the input operation.

Data for forming a form (layout) of an input screen to be displayed in the display device 6 is stored in the form data memory 4. Form data is stored in accordance with scenes such as search input, song selection, and performance. An image data file and a resource of sound are included, and stored in JAR.

The display screen preparation section 5 first inputs a search input form from the form data memory 4, inputs search query data from the input section 2, and prepares a search query input screen. Secondly, a song selection form is inputted from the form data memory 4, search result data is inputted from a server (not shown) via the interface 3 and radio transmission/reception circuit 7, and a song selection screen is prepared. Thirdly, a performance form is inputted from the form data memory 4, karaoke image data and words data are inputted from the server, and a performance screen is prepared.

For the song search, new song information is designated, or keywords such as a song title, artist name, songwriter, and composer, and a hint on sing start are inputted. Then, the search is requested to a server side. Only data of the search result is sent back from the server side.

On the terminal side, a display element only of a background of a display screen or a fixed display text portion is formed by the form data, and is combined with display elements of the aforementioned search query data, search result data, and karaoke image data so that a predetermined arrangement relation is satisfied, and the display screen is thus prepared.

Additionally, an image of the background of the aforementioned display screen or the fixed display text portion, and an image of the aforementioned search query data, search result data, and karaoke image data are formed as separate display layers, then two display layers are combined, and one image of the display screen may thus be prepared.

The interface 3 is a connection section for interconnection among the application program, other original functions of the mobile telephony terminal such as a telephone transmission/reception function and talking function, conventional information service functions such as a browser function and electronic mail function, and the radio transmission/reception circuit 8.

A search request, distribution request and the like designated by the user are sent to a server of a contents provider associated with the application program via the radio transmission/reception circuit 7 and network. The terminal can connect only to uniform resource locators (URL) (a protocol, server address, and port number are identified) which is downloaded by the application program.

Moreover, the conventional browser function downloads a ringing tone melody of the song designated by the user from the same server.

The karaoke music performance data memory 8 is built into a scratch pad from the server, and can be accessed only by a particular application program of karaoke performance. Access to the scratch pad and resource is executed by using a generic connection framework, and concretely by designating the URL.

The tone generator 9 inputs karaoke music performance data from the karaoke music performance data memory 8, generates a music sound signal, and outputs the signal via the speaker 10. Moreover, the music performance data for the ringing tone melody is inputted from the ringing tone melody memory 11, and the music sound signal is generated and outputted from the speaker 10.

Performance control of tempo, pitch, and the like can be carried out by the application program. Moreover, a tone, chord number, effect application, words display, background screen display, and the like can also be controlled.

The ringing tone melody can be downloaded into the ringing tone melody memory 11 from the server by the browser function. When there is a call by the telephone function, the ringing tone melody is reproduced.

FIG. 2 is an explanatory view showing concrete examples of the input screens displayed in the display device 6 shown in FIG. 1. In the drawing, reference numeral 21 denotes a top screen of a karaoke distribution service, 22 denotes a song selection screen by a new song search result, 23 denotes a song selection screen on the next page of the song selection screen 22, 24 denotes a song search query input screen, 25 denotes a song selection screen by the song search result, and 26 denotes a music performance screen. Additionally, display elements not directly related to the present invention, such as a symbol indicating a reception strength of a radio wave, and a symbol indicating an operation mode are omitted from the drawing.

Figure 2A:
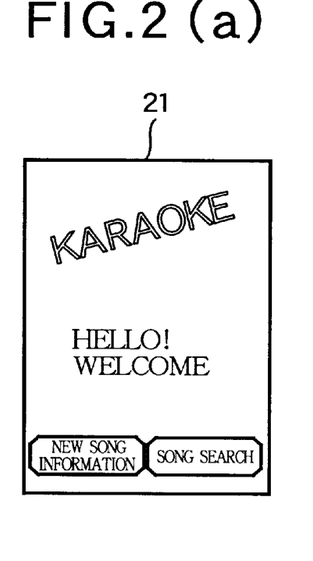

All display (including a sound) elements such as a title image, title message, and starting melody can be prepared by a resource of the form data memory 4 on the terminal side in the top screen 21 of the karaoke distribution service.

When a soft key L (new song information) is depressed on the top screen, a request of new song information is made with respect to the server. Therefore, this screen also serves as a search request screen in which a search query of "new song" is inputted.

Figure 2B:
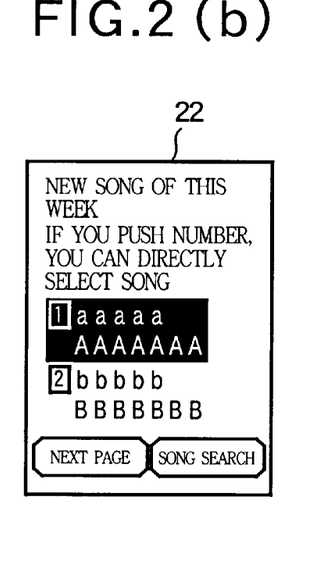

Data of one or a plurality of songs and artist names which agree with the condition of the new song information are transmitted from the server, and therefore taken. The taken one or plurality of songs are inserted into a new song search result form of the form data memory 4 on the terminal side, the song selection screens 22, 23 by the new song information are prepared as shown in the drawing, and the song selection screen 22 is first displayed.

When "soft key L" (next page) is depressed in the song selection screen 22, the next song selection screen 23 is displayed. When the existing display page is a final page, "one page" is displayed instead. On the other hand, when "soft key R" (song search) is depressed, the screen changes to the song search query input screen 24 described later. In the shown example, aaaaa to ggggg indicate the artist names (a singer or a player), and AAAAAAA to GGGGGGG indicate the song titles.

When numeral keys ("1" to "9", "0") on the operation panel are depressed, the page of the corresponding song on the server side is called, and downloaded. Moreover, the song and artist name to be subjected to a focus display (highlight display, reverse display) successively move by an "up" key, or a "down" key on the operation panel. Then, when an "enter" key on the operation panel is depressed, the screen shifts to a download screen (not shown), a certain page of the corresponding music performance data file on the server side, subjected to the focus display, is connected, and starts to be downloaded.

Additionally, the song selection screen 22 has a display of titles and description. However, the song selection screen 23 does not have such display. Even when the numeral key corresponding to the number of the song not displayed in the existing page is depressed, the screen shifts to the download screen of the song. Forms of both the artist name and the song title are set beforehand for a plural-lines display. When the highlight display is positioned in a first song, the page is moved to the previous page by the "up" key. When the focus display is positioned in a last song, the page may be moved to the next page by the "down" key. When there is no allowance in a storage capacity of the resource, the song selection screen 22 may be used as the top screen instead of employing the top screen 21.

Figure 2D:
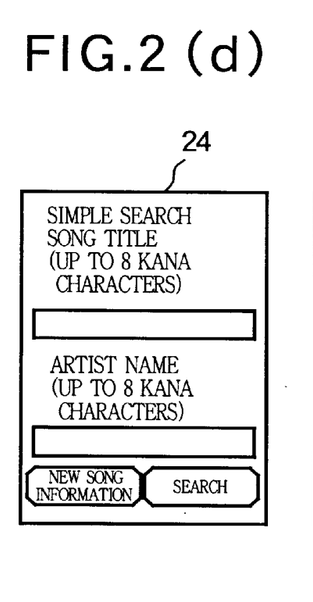

On the other hand, when the soft key R (song search) is depressed in the top screen 21 or the like, the song search query input screen 24 is prepared. A "simple search" indicating the song search and associated description are displayed, and there are displays of a text box for inputting a song title free word, and a text box for inputting an artist name in free word. This screen can be prepared by the resource of the song search input form of the form data memory 4 on the terminal side.

When the user inputs the song title and/or the artist name in the respective text boxes on the display screen by key operation, inputted character data is displayed in the text box. The focus-displayed text box changes by the "up" key or the "down" key. When the "enter" key is depressed, the focused text box is selected. When the "soft key L" (new song information) is depressed, the search request of the new song information is made to the server, and the screen changes to the song selection screen 22.

Figure 2E:
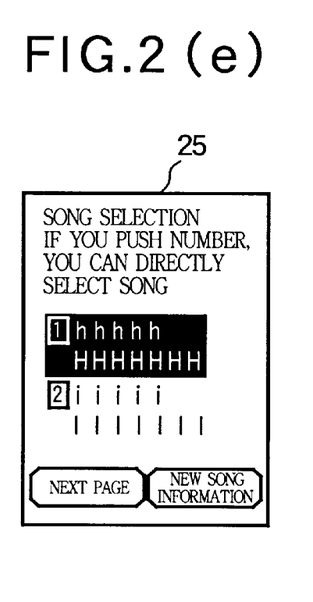

On the other hand, when the "soft key R" (search) is depressed, the song search is requested to the server. When the data of the song title and artist name of the search result is received from the server, the screen changes to the song selection screen 25 by the song search result. The title "song selection", and brief description are displayed as the song selection form of the form data memory 4 on the terminal side, one or a plurality of data of "song title" and "artist name" taken from the server side are displayed in a predetermined position, and the song selection screen 25 is prepared as shown in the drawing.

Additionally, when the next page exists, the display screen similar to the song selection screen 23 is displayed by the "soft key R" (next page). For the song selection ten songs at maximum are displayed. When a search hit number exceeds ten, a message urging another search is displayed. Since the key operation in the display screen is similar to the operation in the song selection screen 22, description is omitted.

The aforementioned song selection screens 22, 23, 25 shift to the download screen (not shown), URL from which the focus-displayed music performance data file can be obtained is connected, and the music performance data distributed from the server side is then downloaded into the karaoke music performance data memory 8 of FIG. 1. The screen changes to the performance screen 26 simultaneously with the download end, the music performance data starts to be reproduced, and thereby generation of the music sound signal, and display of the lyric words and image are started.

Figure 2F:
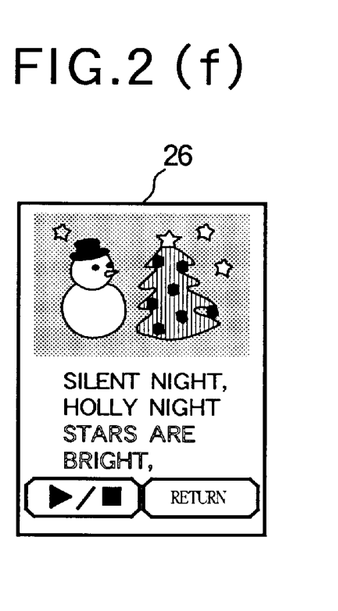

Additionally, it is also possible to employ a streaming reproduction system. In this system, the music performance data is simultaneously reproduced during downloading.

Moreover, a first type of the display data in the music performance data is divided into an upper half of the display screen as an image region and a lower half as a words text display region (for two lines). As a second type, an entire face (six lines) is used for image data as a wall paper, and text display of words is superposed. For the words, a position to sing in accordance with progression of the song is displayed by a color change or the like. The image is moved by switching a stationary image.

Every time the soft key L (denoted by black triangular/black square) is depressed, stop/start of reproduction is alternately switched. A restart position of reproduction is set in an immediately previous reproduction stop position. It is also possible to designate the reproduction position, to raise/lower a key (interval) of the music sound signal, or to raise/lower a tempo of the performance by the operation of the "up" key, "down" key, and the like.

Songs associated with the played song are automatically displayed in a form similar to that of the song selection screen 25 at the end of the reproduction of the music performance data or before the "soft key R" (return) is depressed to return to the top screen 21, and the focus-displayed song may be downloaded into the karaoke music performance data memory 8 by the "enter" key.

Alternatively, as described later with reference to FIG. 3, the music performance data which has the same song title and which is dedicated for the ringing tone melody may be shifted to a download (purchase) phase. As the music performance data for the ringing tone melody, for example, the words data is removed from the karaoke music performance data, and a range of at least one of a performance time, tone number, simultaneously emitted sound number (chord number), note type, and the like is limited.

Additionally, the processing of the application program ends by an operation for turning off a power source in any screen. On the other hand, it is possible to hold the karaoke music performance data even after the end of the application program. However, in this embodiment, the karaoke music performance data is also erased simultaneously with the end of the application program.

Moreover, when there is a telephone call during karaoke performance, the application program is forced to quite. In this case, the karaoke data may not be erased.

Furthermore, when the application program ends, the new song information data or the search result data transmitted from the server side is transferred to the scratch pad from an execution memory region, and can be reused during starting of the next application program.

On the other hand, the ringing tone melody is allowed to be held in the memory after the end of the application program, and even after the power source is turned off.

Figure 3:
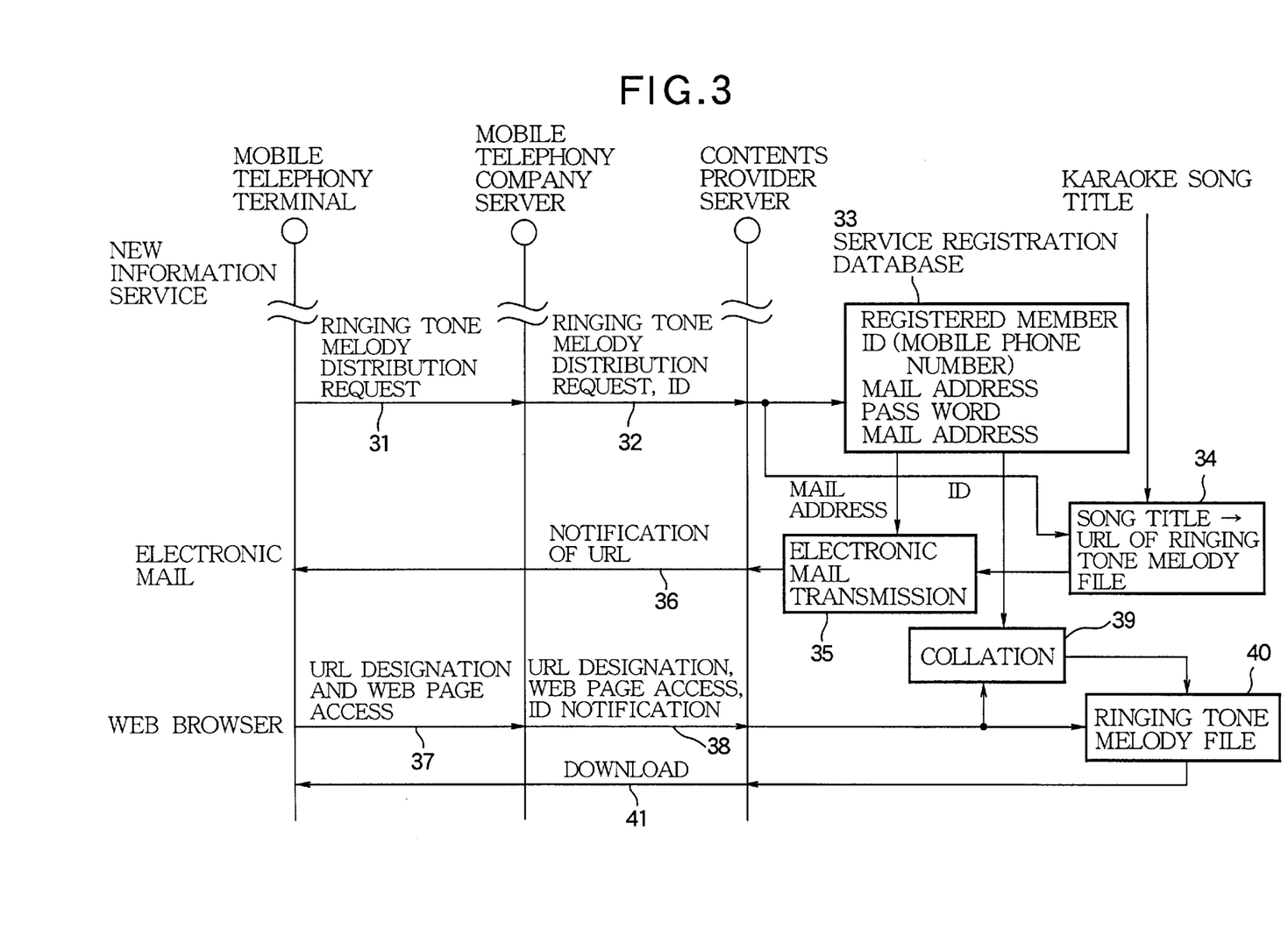
FIG. 3 is a schematic sequence diagram showing an operation for linking a distribution service of karaoke music performance data with a distribution service of a ringing tone melody.
Figure 3C:
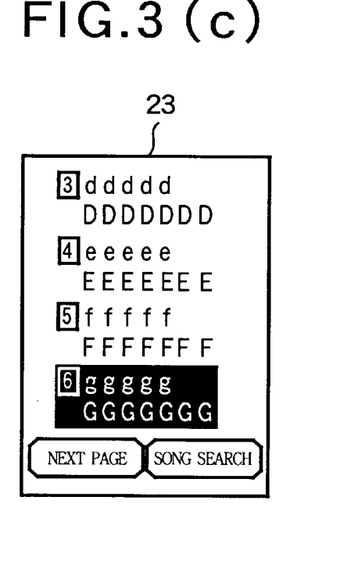

FIG. 3 is a schematic sequence diagram showing an operation for linking the distribution service of the karaoke music performance data with the distribution service of the ringing tone melody in one embodiment of a server apparatus for distributing the music performance data to the telephony terminal apparatus.

The mobile telephony terminal is connected to the server of a mobile telephony company (so-called i-mode server) via a packet network. On the other hand, the server of the mobile telephony company is connected to another server of the contents provider via an exclusive-use line in some case, and via Internet in other case. The exclusive-use line connection is used when the karaoke distribution service is an official site, and the Internet connection is used with an unofficial site.

It is assumed that there is a distribution request 31 of the ringing tone melody from the mobile telephony terminal side after the end of distribution of the karaoke music performance data. The mobile telephony terminal quits a new information service by the application program, and changes a mode to an electronic mail mode. The mobile telephony company server transmits a distribution request 32 of the ringing tone melody notifying an identification (ID) of the mobile telephony terminal, such as a telephone number of the mobile telephony terminal, to the contents provider server. The contents provider server inquires about the received ID with respect to a service registration database 33, and obtains a reply indicating that the electronic mail address of a registered member and the received ID belong to a regular user. Moreover, for the ringing tone melody distribution request, a correspondence table 34 of "song title→URL of the ringing tone melody file" is referred to.

The contents provider server transmits an electronic mail 36 notifying the URL taken from the correspondence table 34 to a mail address obtained from the service registration database 33 in an electronic mail transmitter 35 in order to notify the mobile telephony terminal of the URL of the ringing tone melody of the same song as that of the karaoke music performance data. The mobile telephony company server transmits the electronic mail 36 to the mobile telephony terminal via the packet network. On receiving the electronic mail 36, the mobile telephony terminal displays a text of the mail. When the user designates the URL in the text with the operation key, a web page designated by the URL is automatically accessed.

This access 37 is transmitted to the mobile telephony company server via the packet network. The mobile telephony company server simultaneously notifies the contents provider server of the ID of the mobile telephony terminal.

In the contents provider server, a location of the ringing tone melody file is specified by the URL having been accessed. Moreover, the ID is acquired by notification of the ID, and is collated with a regular ID of the karaoke performance obtained from the service registration database 33 in a collation section 39. As a result, when the notified ID matches the regular ID, a ringing tone melody file 40 is downloaded into the mobile telephony terminal via the mobile telephony company server.

The ringing tone melody of the same song title can be distributed by carrying out the aforementioned procedure after the end of the distribution of the karaoke music performance data by the new information service.

In this case, the processing for collating the ID of the mobile telephony terminal is carried out during distribution of the ringing tone melody. Therefore, even when a third party not having received the distribution of the karaoke performance unfairly obtains the URL of the ringing tone melody and requests the download, the ID of the mobile telephony terminal apparatus is not matched, and the third party cannot receive the distribution of the ringing tone melody.

Additionally, the user may transmit a password via the mobile telephony terminal without being notified of the ID from the mobile telephony company server.

Moreover, in another system, the electronic mail with the ringing tone melody attached thereto is transmitted and the attached file can be used as the ringing tone melody in the mobile telephony terminal. In such a case, the electronic mail with the ringing tone melody attached thereto may be transmitted instead of the electronic mail 36 notifying the URL. In this case, the subsequent download by the web browser becomes unnecessary.

Moreover, the URL of the ringing tone melody may be displayed in a display of the mobile telephony terminal from the server side at a time of the ringing tone melody distribution request. In this case, the user may write down the URL on paper, ends the new information service, and inputs the URL in an HTTP input region of the web browser. In this case, the notification of the URL may not be carried out via the electronic mail.

The karaoke performance is charged as a monthly payment in the mobile telephony company server. On the other hand, the distribution service shown in FIG. 3 is designed such that the ringing tone melody distribution accompanying the karaoke performance distribution is free of charge. However, it is also possible to change a sequence of FIG. 3 and to constitute a system in which the ringing tone melody is independently charged.

Moreover, in the above description, the second content is the ringing tone melody. Additionally, the words, image data of karaoke, score data, or photograph or profile text of the artist may be downloaded with respect to the same song by the web browser. These second contents can be stored in a flash memory of the mobile telephony terminal, then transferred to a personal computer, and used later. Moreover, the contents may be downloaded into an attachable/detachable semiconductor memory card.

Figure 4:
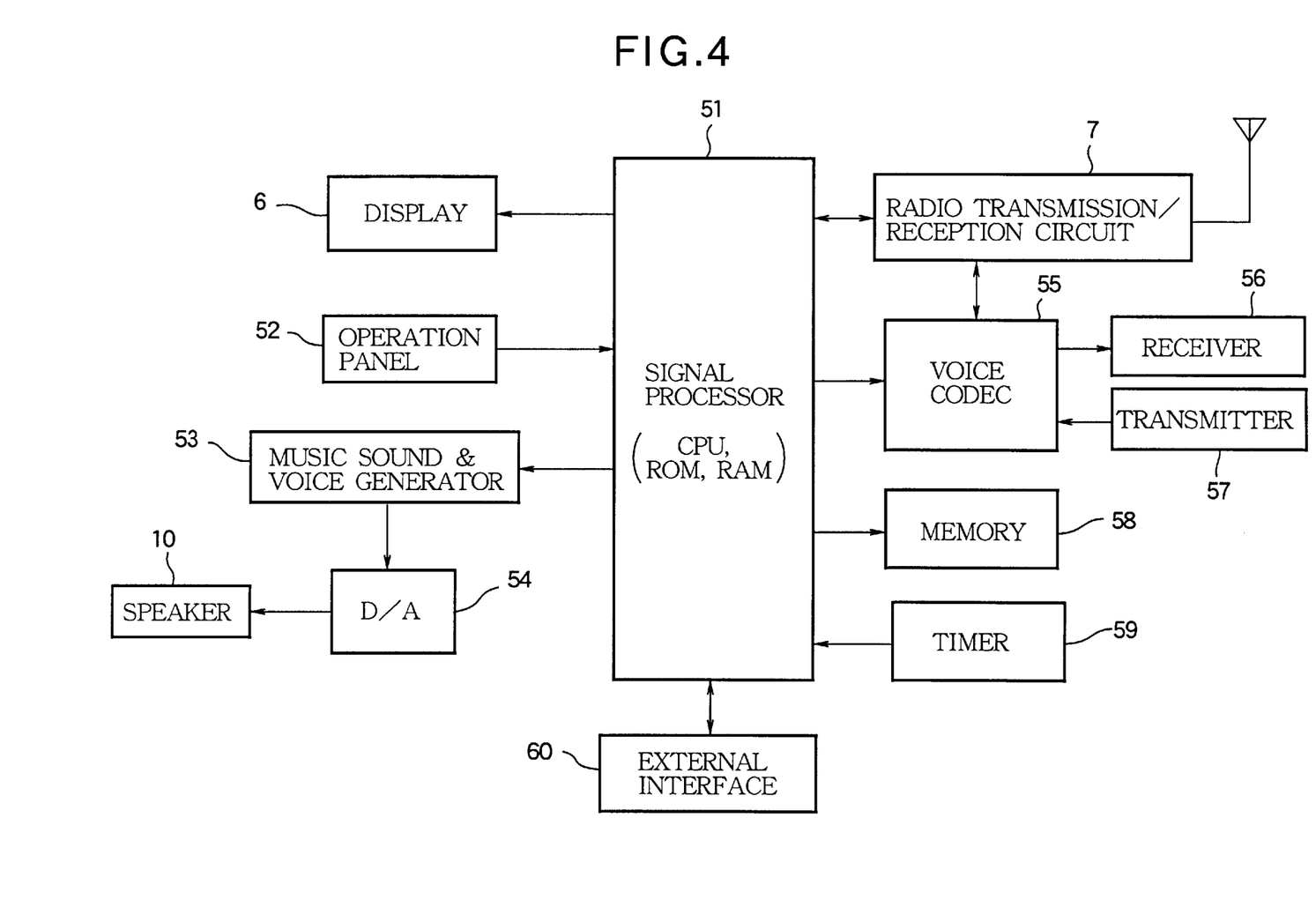
FIG. 4 is a block diagram showing one example of a hardware constitution of the telephony terminal apparatus of the present invention.

FIG. 4 is a block constitution diagram showing one example of a hardware constitution of the telephony terminal apparatus of the present invention.

In the drawing, a part similar to that of FIG. 1 is denoted with the same reference numerals. Reference numeral 51 denotes a signal processor in which a read only memory (ROM), and random access memory (RAM) are incorporated in addition to a central processing unit (CPU). The ROM and RAM may be disposed outside. An operating system of the mobile phone, native software, Java application manager (JAM), and the like are stored in the ROM in the signal processor 51.

The CPU in the signal processor 51 executes the operating system and native software stored in the ROM, and thereby executes a telephone communication function, web browser function, and electronic mail function. The application program is executed as a virtual machine.

The RAM in the signal processor 51 is used as a working memory including various registers, flags, and the like necessary for executing the program.

Reference numeral 52 denotes an operation panel which includes the input key of FIG. 1. There are operators for carrying out various inputs such as on/off of the power source, telephone number, search query designation, performance operation, and electronic mail text input.

The display device 6 displays information such as a set content of the apparatus, operation mode, telephone number, telephone directory, words data during karaoke performance, background image, score, and electronic mail.

Reference numeral 53 denotes a music sound and voice generator, and corresponds to the tone generator 9 of FIG. 1, but also functions as a tone generator for guidance of the operation with a voice besides the music sound signal. A synthesis output is converted to an analog signal by a D/A converter 54, amplified by an amplifier (not shown), and outputted via the speaker 10. A calling sound (ringing tone melody), automatically played music sound of karaoke, voice guidance, and the like are outputted from the speaker 10.

In the function of a telephone set, a voice CODEC 55 D/A converts the other voice and outputs the voice via a receiver 56, and inputs one's own voice into a transmitter 57 and A/D converts the voice.

Reference numeral 58 denotes a memory which adds to the storage capacity of the ROM or the RAM in the signal processor 51. Attachable/detachable memories such as a power source backed up RAM, flash memory ROM, and semiconductor memory card may be used. The memory is used as a storage region of the ringing tone melody of the mobile telephony terminal, set value of the apparatus, telephone directory, and mail.

Reference numeral 59 denotes a timer which is used in an interrupt processing or the like of the CPU in the signal processor 51. Reference numeral 60 denotes an external connection interface for connecting the mobile telephony terminal to a PDA terminal or the personal computer. The mobile telephony terminal may be used as a network interface of the PDA terminal or the personal computer, or used for inputting/outputting the ringing tone melody or the telephone directory.

FIGS. 5 to 10 are flowcharts of the operation of the telephony terminal apparatus according to the present invention.

Figure 5:
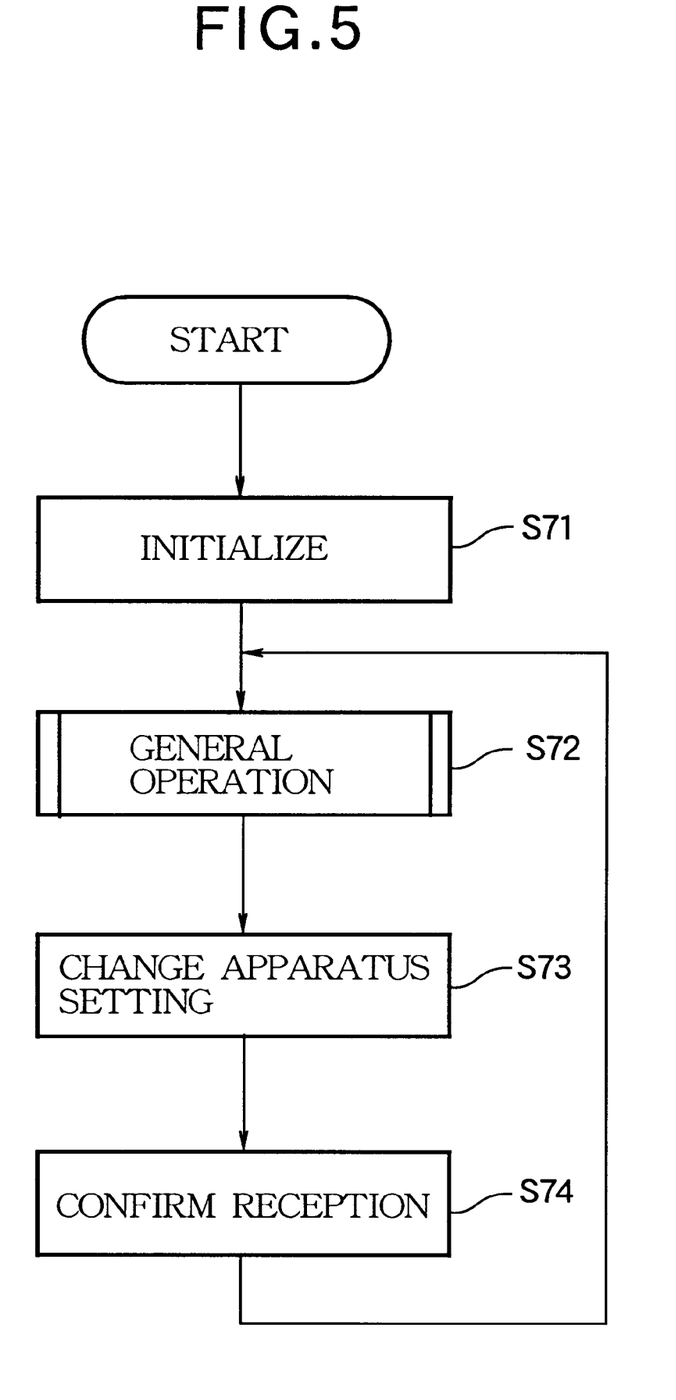
FIG. 5 is a main flowchart showing an operation of one embodiment of the present invention.

FIG. 5 is a main flowchart.

When a power source key of the mobile telephony terminal is depressed, a flow starts. In S71, various parameters and registers are initialized. In S72, a general operation for making a telephone call or receiving the telephone call is detected. Details will be described with reference to FIG. 6.

In S73, a processing for changing various settings of the apparatus is carried out. In S74 reception is confirmed. A processing for notifying the user of a call with the ringing tone melody, a vibrator, and the like is carried out when there is a call on one's own terminal, or a processing for ending data reception is carried out when there is data reception during talking. When the processing of S74 ends, the processing returns to S72. When an operation for turning off a power is performed in S72, the flow is stopped, and the operation of each block also ends.

Figure 6:
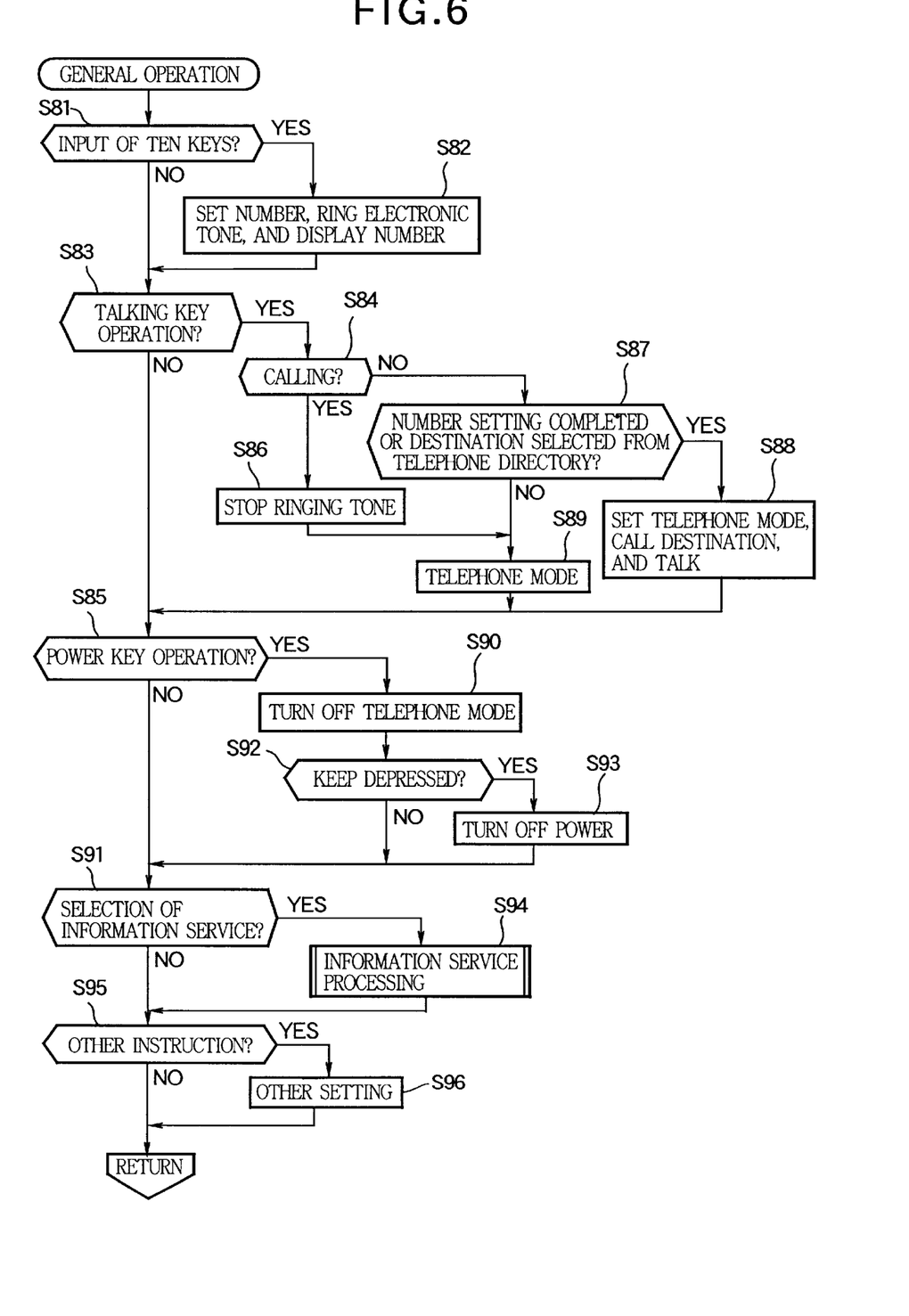
FIG. 6 is a flowchart showing details of a general operation shown in FIG. 5.

FIG. 6 is a flowchart showing details of the step S72 of the general operation shown in FIG. 5.

If the user depresses ten keys (including symbol keys of \*, and the like) in S81, the processing advances to S82. If not, the processing advances to S83. In S82, an electronic sound is rung, an inputted number is displayed in the display screen, and the processing advances to S83.

If the user depresses a "talking key" in S83, the processing advances to S84. If not, the processing advances to S85. It is judged in S84 whether or not a call is being made. If there is the call, the processing advances to S86. If not, the processing advances to S87.

A ringing tone is stopped in S86, and the processing advances to S89. On the other hand, if a number is set with the ten keys (S82), or a talking destination is selected with a telephone directory function in S87, the processing advances to S88. If not, the processing advances to S89.

In S88, a telephone mode is set, and the set talking destination is called. If there is a response, talking is enabled, and the processing advances to S85. On the other hand, also in S89, the telephone mode is set. If there is a call from the other side, talking is enabled, and the processing advances to S85.

If the user depresses a "power source" key in S85, the processing advances to S90. If not, the processing advances to S91. The telephone mode is turned off in S90, and the processing advances to S92. During talking, telephone connection is cut. When the "power source" key is depressed long (for about three seconds) in S92, the power of the telephony terminal is turned off, and the processing advances to S91.

Figure 7:
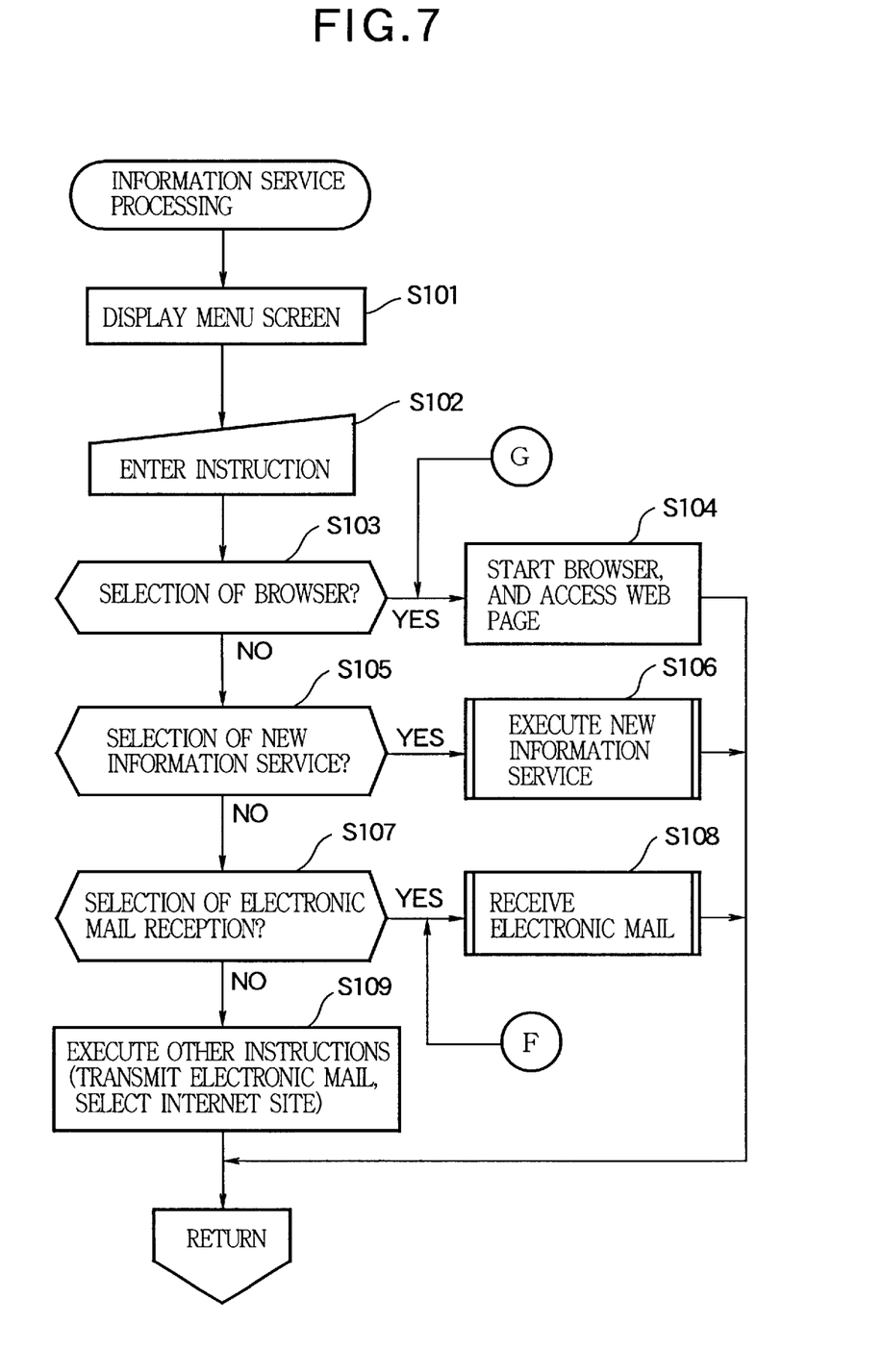
FIG. 7 is a flowchart showing details of an information service process shown in FIG. 6.

If an "information service" key is depressed in S91, the processing advances to S94. If not, the processing advances to S95. An information service described later with reference to FIG. 7 is executed, and the processing advances to S95. If there is another instruction in S95, a setting is made in accordance with the instruction in S96 and the processing returns to a main routine. If there is no other instruction, the processing returns to the main routine as such.

FIG. 7 is a flowchart showing details of the step of the information service shown in FIG. 6.

A menu screen associated with the information service is displayed in S101. Additionally, since the new information service is mainly described, a setting does not necessarily agree with a mode setting in the marketed mobile telephony terminal.

First is "web browser", second is "new information service", and third is "electronic mail".

A menu selection is accepted in S102.

When there is a selection of "web browser" in S103, the web browser is started in S104, the URL is inputted, the web page is accessed, and the processing returns to S95 of FIG. 6. In addition to simple browsing of the web page, the application program is downloaded and stored in a predetermined memory region of a mobile phone apparatus, or the ringing tone melody is downloaded and stored in the predetermined memory region of the mobile phone apparatus.

When there is a selection of the new information service in S105, one of the new information services is selected and the application program is executed in S106, and the processing returns to S95.

When there is a selection of electronic mail reception in S107, the electronic mail is received in S108, and the processing returns to S95 of FIG. 6.

When there is no selection of the electronic mail reception in S107, the processing advances to S109, other processings such as site selection and mail transmission are executed, and the processing returns to S95 of FIG. 6.

A "site" indicates the official site of the mobile telephony company, and is connected to the top page of a specified service, when the display screen is viewed and the service is selected with the keys without inputting the URL.

Additionally, in the above description, the web browser is used to download the application program of the new information service, but the URL of the contents provider server connected to an exclusive-use circuit may be designated and downloaded without being notified to the user in conventional site selection.

Figure 8:
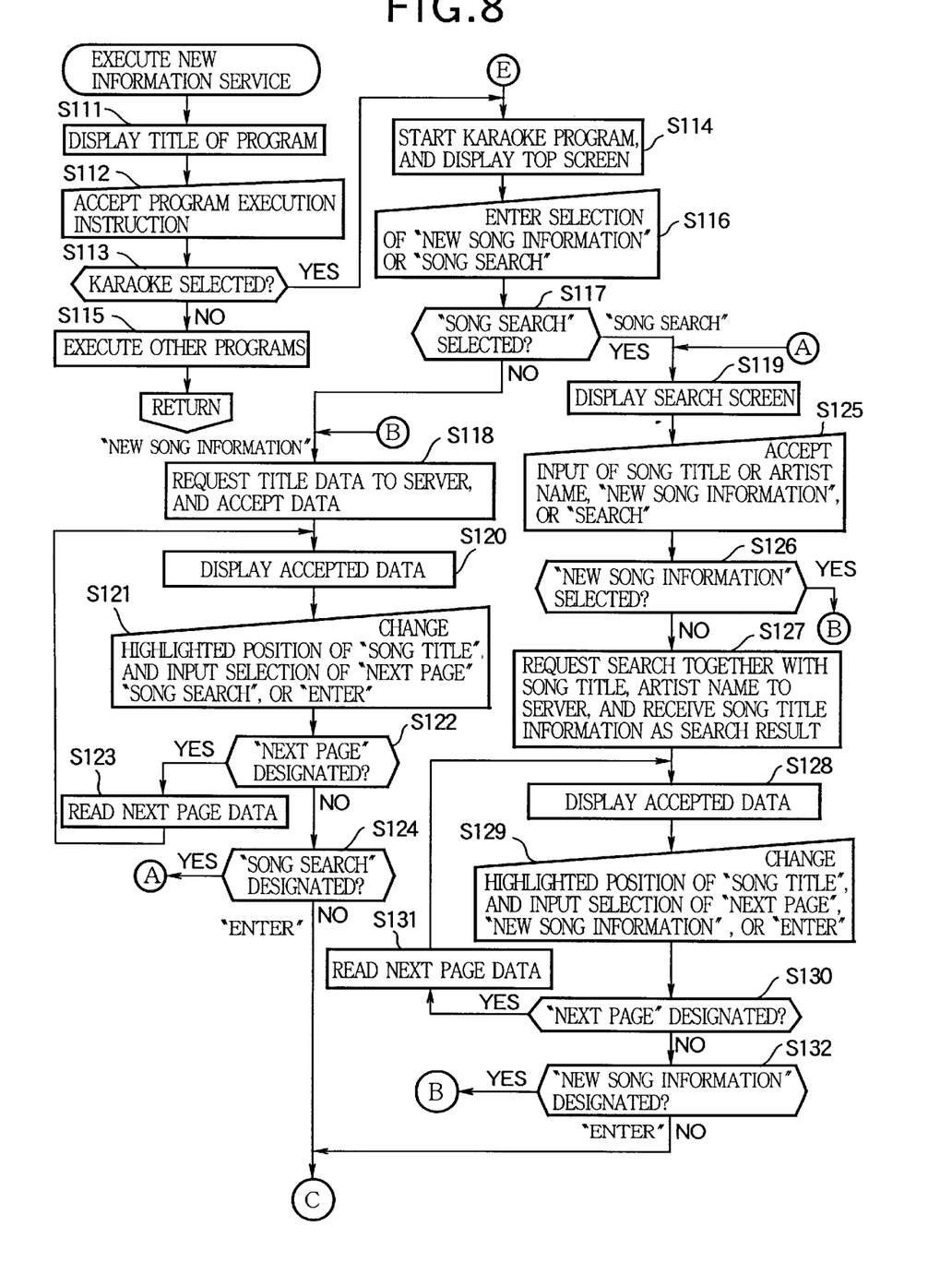
FIG. 8 is a first flowchart showing details of a new terminal service shown in FIG. 7.

FIG. 8 is a first flowchart showing details of the new information service shown in FIG. 7.

Figure 9:
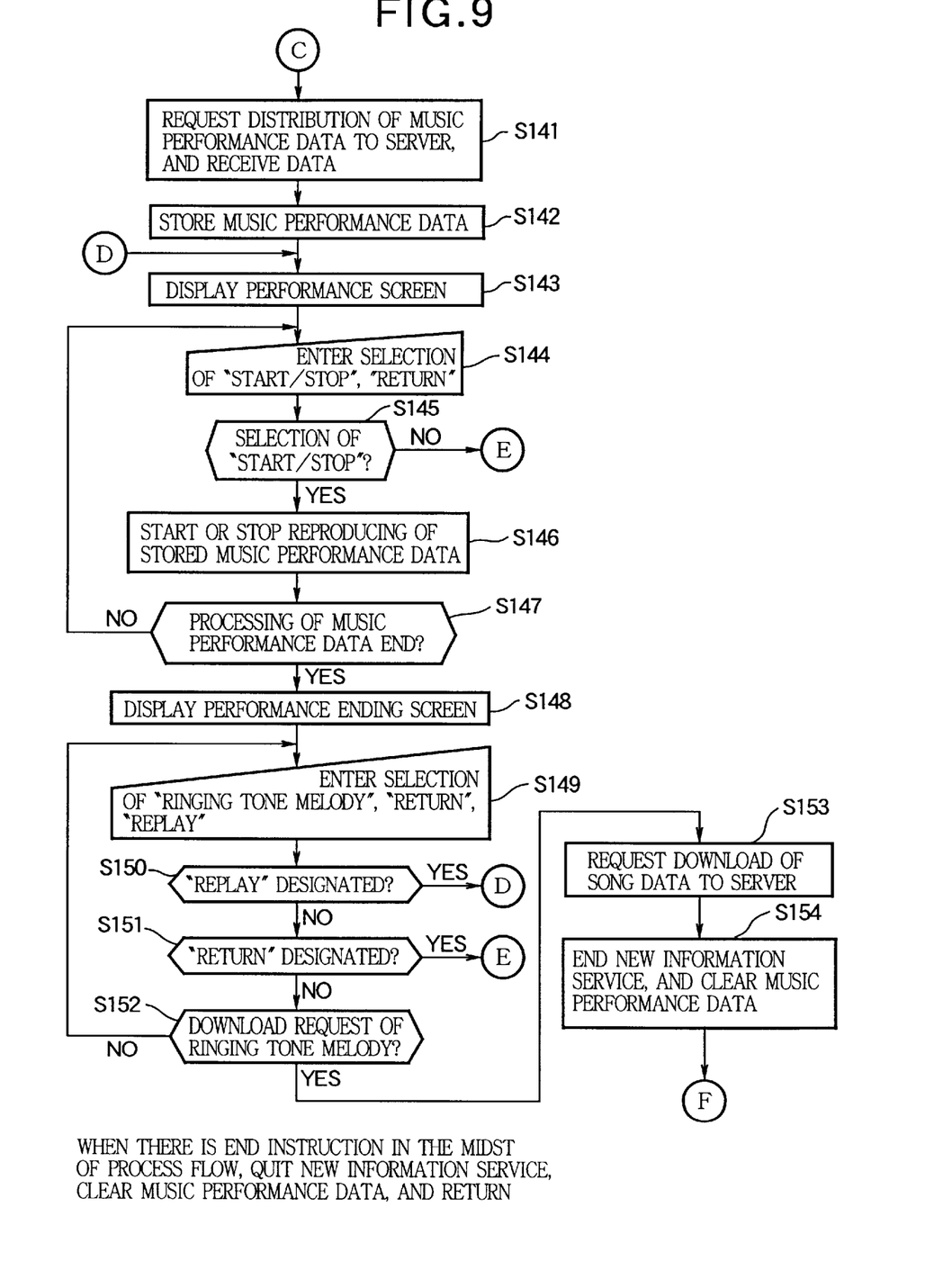
FIG. 9 is a second flowchart continued from the first flowchart shown in FIG. 8.

FIG. 9 is a second flowchart continued from the first flowchart shown in FIG. 8.

A list of titles of the application program is displayed in S111. An execution instruction of the program is accepted in S112. If the application program of "karaoke performance" is selected in S113, the processing advances to S114. If not, the processing advances to S115, and other programs are executed.

In S114, the application program of "karaoke performance" is started, and the top screen (21 of FIG. 2) is displayed. A selection of "new song information" or "song search" is accepted in S116. When the "song search" is selected in S117, the processing advances to S119. When the "new song information" is selected, the processing advances to S118.

Title data of the new song is requested to the server, and accepted in S118. The accepted data is displayed in S120 (22 of FIG. 2). A highlighted position (focus position) of the "song title" is changed, and a selection of "next page" or "song search" is accepted in S121.

If the "next page" is designated in S122, the processing advances to S123. If not, the processing advances to S124. The data of the next page is read in S123, the processing returns to S120, and the next page (23 of FIG. 2) is displayed. Additionally, every time the page is changed, additional data may be requested to the server and accepted.

If the "song search" is designated in S124, the processing advances to S119. If not, "enter" is accepted, and the processing advances to S141 of FIG. 9.

On the other hand, when the "song search" is selected in S117, the processing returns to S119, and the song search screen (24 of FIG. 2) is displayed. An input of the song title or the artist name, "new song information", "search" is accepted in S125. When the "new song information" is selected in S126, the processing returns to S118. When the "search execution" is selected, the processing advances to S127.

A search instruction is requested to the server together with the song title or the artist name, and song title information is accepted as the result in S127. The accepted data is displayed in S128 (25 of FIG. 2). The highlighted position (focus position) of the "song title" is changed and a selection of "next page" and "new song information" is accepted in S129. If the "next page" is designated in S130, the processing advances to S131. If not, the processing advances to S132. The next page is read in S131 and the processing returns to S128. If the "new song information" is designated in S132, the processing advances to S118. If not, the "enter" key is designated, and the processing advances to S141 of FIG. 9.

The distribution of the music performance data is requested to the server, and received in S141 of FIG. 9. The music performance data is stored in the scratch pad in S142. A performance start screen is displayed in S143. A selection of "start/stop", "return" is accepted in S144. When there is the selection of "start/stop" in S144, the processing advances to S146. When there is the selection of "return", the processing advances to S114 of FIG. 8, and the screen returns to the top screen (21 of FIG. 2) of karaoke performance.

Through every S146, an operation for starting reproduction of the stored music performance data, and an operation for stopping the reproduction are alternately switched, and the processing advances to S147. In this case, with generation of the music sound signal, words display of the performance screen (26 of FIG. 2), and image display are updated. If the processing of the music performance data ends in S147, the processing advances to S148. If not, the processing returns to S144.

A screen of performance end is displayed in S148. A selection of the "ringing tone melody", "top", "replay" is accepted in S149. When the "replay" is designated in S150, the processing returns to S143. When "return" is designated in S151, the processing returns to S114 of FIG. 8. If the "ringing tone melody" is designated in S152, the processing advances to S153, and the download is requested to the server. If not, the processing returns to S149, and waits for the selection.

Figure 10:
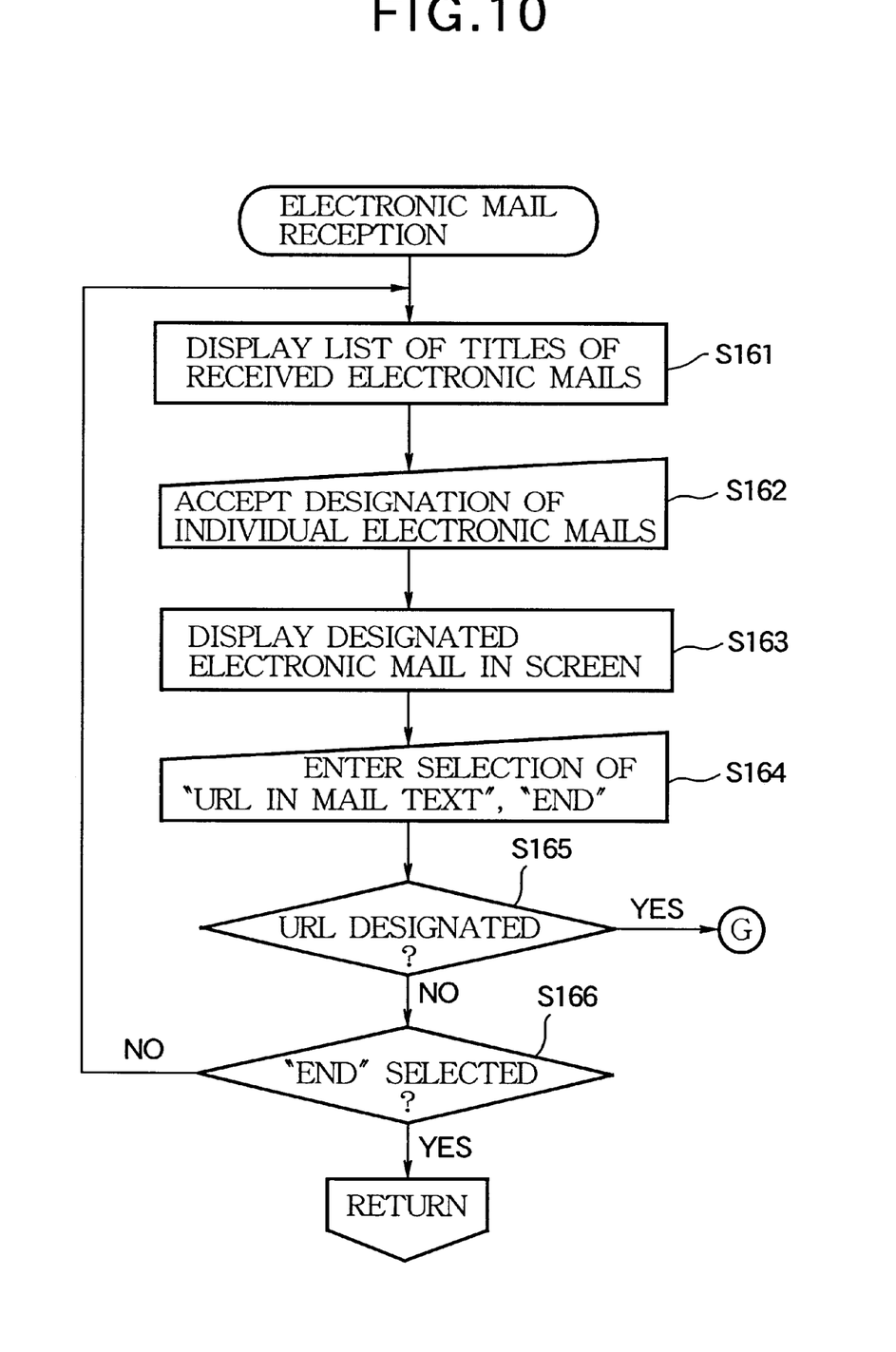
FIG. 10 is a flowchart showing details of electronic mail reception process shown in FIG. 7.

FIG. 10 is a flowchart showing details of mail reception of S108 shown in FIG. 7.

A list of titles of received electronic mails is displayed in S161. Designation of individual electronic mails is accepted in S162. The designated electronic mail is displayed in the display in S163. A selection of "URL" in the text of the electronic mail or "end" displayed under the screen by the soft key is accepted in S164.

If the URL is designated in S165, the processing advances to S104 of FIG. 7, a mail reception mode ends, the browser is started, and the web page of the URL is accessed. If not, the processing advances to S166. If the "end" is designated, the processing returns to S95 of FIG. 1 via the return of FIG. 7. If not, the processing returns to S161, and is repeated.

In the above description, the karaoke performance has been described as a concrete example of the application program by the new information service. In the application program, since a multimedia processing of a sound, picture, character, and the like is enabled, the program may display the words (words card display) or the score of the searched and selected song. In this case, the music sound signal may not necessarily be outputted.

Moreover, the program may be game software program in which a music sound is generated in response to the performance. In any case, the distribution of the ringing tone melody, and the like of the song played by the program can be received.

Moreover, in the above description, the mobile telephony terminal of a cellular system in which the new information service can be utilized has been illustrated, but the present invention can similarly be applied to a mobile telephony terminal apparatus in which the application program is stored and executed on a mobile telephony terminal side.

For example, the present invention can also be applied to the mobile telephony terminal of a PHS system, a personal digital assistant (PDA) terminal apparatus having a telephone communication function, a cable subscriber telephony terminal apparatus with the display attached thereto, and information household electrical apparatuses such as television having the telephone communication function.

It is particularly preferable to apply the present invention to a system in which a virtual machine is introduced and the application program is executed separately independently of the original telephone communication function or information service function.

As apparent from the above description, the present invention has an effect that a communication data amount, or a communication time is reduced during display of a search result with respect to a search request, and a communication charge can be reduced.

There is an effect that first and second distribution means can cooperate to distribute music performance data and ringing tone melody.

Therefore, with application to karaoke performance distributed from a server apparatus, there can be provided a karaoke performance system which is functionally used, in which a service is easily utilized, and whose copyright is protected also for a contents provider.

What is claimed is:

1. An information service system comprising: a server apparatus for distributing music performance data through a network; and a telephony terminal apparatus for acquiring the music performance data from the server apparatus through the network, wherein the telephony terminal apparatus comprises a storage section that stores an application program, and a processing section that executes the application program for sending a search query effective to specify target music performance data to the server apparatus and acquiring the target music performance data from the server apparatus for exclusive use by the application program, and wherein the server apparatus comprises a first distributing section responsive to the search query for distributing the target music performance data to the telephony terminal apparatus in the form of first contents which are dedicated for use by the application program, and a second distributing section responsive to a request from the telephony terminal apparatus for distributing second contents of the same target music performance data to the telephony terminal apparatus such that the second contents can be treated by the telephony terminal apparatus independently of the application program.

2. A telephony terminal apparatus for use in an information service system and being communicable with a server apparatus distributing contents through a network, the telephony terminal apparatus comprising a storage section that stores an application program and a processing section that executes the application program for performing a process comprising the steps of:

prompting a user to input a search query effective to specify target music performance data;

sending the search query to the server apparatus through the network for enabling the server apparatus to search for contents matching the search query;

receiving one or more of identification information corresponding to the contents matching the search query from the server apparatus;

displaying the received identification information in a selection screen form that is formulated by the application program;

selecting at least one of the identification information from the selection screen form to request the server apparatus for distribution of the contents corresponding to the selected identification information; and acquiring the target music performance data in the distributed contents from the server apparatus, wherein the distributed contents includes first contents that are dedicated for use by the application program and second contents that can be treated by the telephony terminal apparatus independently of the application program.

3. The telephony terminal apparatus according to claim 2, wherein the target music performance data represents accompaniment sounds of a song and lyric words of the same song.

4. The telephony terminal apparatus according to claim 2, being constructed to be portable by a user.

5. A server apparatus for use in an information service system distributing music performance data through a network to a telephony terminal apparatus installed with an application program treating the music performance data, the server apparatus comprising:

a first distributing section that distributes the music performance data to the telephony terminal apparatus in the form of first contents corresponding to identification information designated by means of the application program;

a receiving section that receives a request for distribution of second contents corresponding to the same identification information from the telephony terminal apparatus after the application program is quitted; and a second distributing section that distributes the second contents to the telephony terminal apparatus such that the second contents can be treated by the telephony terminal apparatus for use of the music performance data while the first contents are exclusively treated by the application program for use of the same music performance data.

6. The server apparatus according to claim 5, wherein the second distributing section distributes the second contents provided that the telephony terminal apparatus requesting the second contents is proved to be identical to the telephony terminal apparatus requesting the first contents.

7. The server apparatus according to claim 5, wherein the second distributing section distributes the second contents which are treated to reproduce the music performance data as a ringing tone sounded when the telephony terminal apparatus receives a phone call.

8. The server apparatus according to claim 5, wherein the first distributing section distributes the first contents which represent accompaniment sounds of a song and lyric words of the same song.

9. A computer program installable in a server apparatus having a processor and distributing music performance data through a network to a telephony terminal apparatus installed with an application program treating the music performance data, the computer program being executable by the processor for causing the server apparatus to perform a process comprising the steps of:

distributing the music performance data to the telephony terminal apparatus in the form of first contents corresponding to identification information designated by means of the application program;

receiving a request for distribution of second contents corresponding to the same identification information from the telephony terminal apparatus after the application program is quitted; and distributing the second contents to the telephony terminal apparatus such that the second contents can be treated by the telephony terminal apparatus for use of the music performance data while the first contents are exclusively treated by the application program for use of the same music performance data.

10. A method of operating a telephony terminal apparatus, which is communicable with a server apparatus distributing contents through a network, and which is installed with an application program, the method comprising the steps of:

starting the application program to prompt a user to input a search query effective to specify target music performance data;

sending the search query to the server apparatus through the network for enabling the server apparatus to search for contents matching the search query;

receiving one or more of identification information corresponding to the contents matching the search query from the server apparatus;

displaying the received identification information in a selection screen form which is formulated by the application program;

selecting at least one of the identification information from the selection screen form to request the server apparatus for distribution of the contents corresponding to the selected identification information; and acquiring the target music performance data in the distributed contents from the server apparatus, wherein the distributed contents includes first contents that are dedicated for use by the application program and second contents that can be treated by the telephony terminal apparatus independently of the application program.

11. A method of distributing music performance data by a server apparatus through a network to a telephony terminal apparatus installed with an application program treating the music performance data, the method comprising the steps of:

distributing the music performance data to the telephony terminal apparatus in the form of first contents corresponding to identification information designated by means of the application program;

receiving a request for distribution of second contents corresponding to the same identification information from the telephony terminal apparatus after the application program is quitted; and distributing the second contents to the telephony terminal apparatus such that the second contents can be treated by the telephony terminal apparatus for use of the music performance data while the first contents are exclusively treated by the application program for use of the same music performance data.

* * * * *